Oct. 28, 1952     J. H. WORTHEN     2,615,254
GAUGING APPARATUS
Filed Dec. 23, 1948     2 SHEETS—SHEET 1
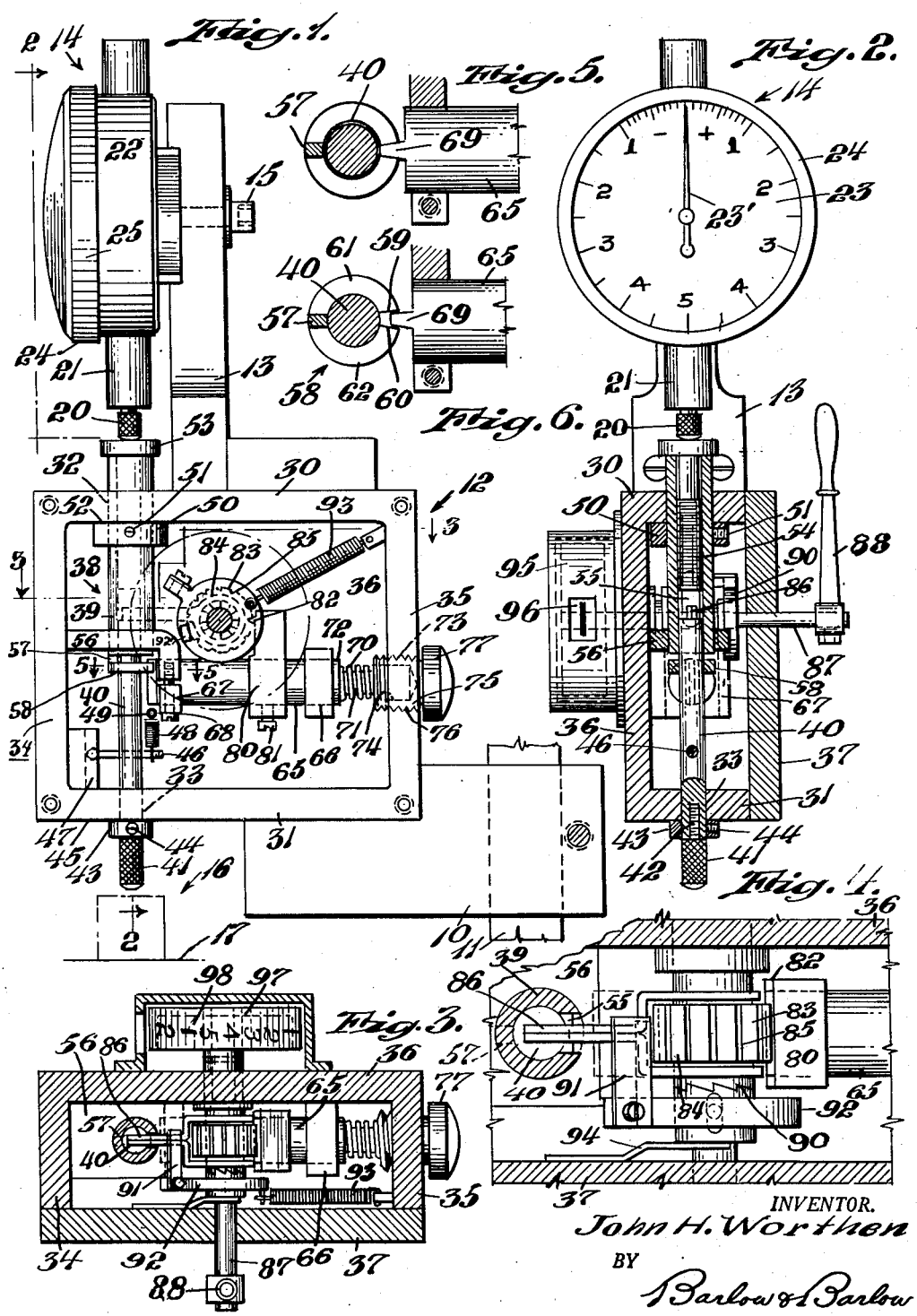
INVENTOR.
John H. Worthen
BY
Barlow & Barlow
ATTORNEYS.

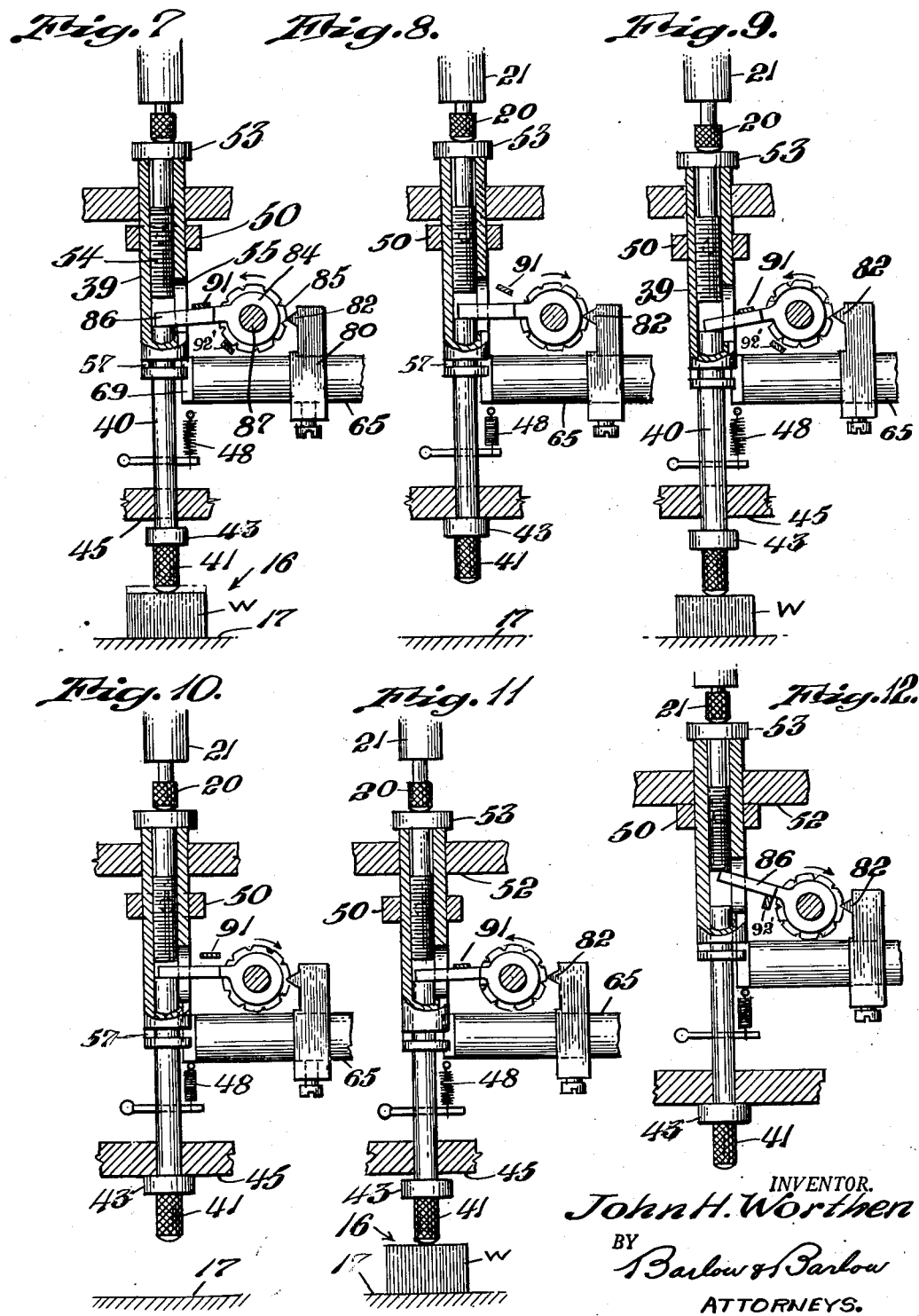

Patented Oct. 28, 1952

2,615,254

UNITED STATES PATENT OFFICE 2,615,254

GAUGING APPARATUS

John H. Worthen, Providence, R. I., assignor to Federal Products Corporation, a corporation of Rhode Island Application December 23, 1948, Serial No. 66,878

5 Claims. (Cl. 33—172)

This invention relates to an apparatus for gaging work and more particularly to a gage for averaging a predetermined number of samples.

Heretofore, if it was desired to average a predetermined number of samples such, for instance, as five or ten samples, a reading of each of the samples was taken, the readings were added and divided by the number of samples; thus, requiring some calculation in order that this might be done.

One of the objects of this invention is to provide a device which may be used for averaging a predetermined number of samples without need for the mental calculation which was necessary heretofore to do so.

Another object of this invention is to provide a device which may be operated in conjunction with a dial indicator so as to accumulate a series of measurements upon several pieces of work.

More specifically, an object of this invention is to provide a measuring rod in two pieces, one of which pieces moves in response to the particular piece of work being measured, while the other piece accumulates the movement of the several pieces, one in addition to another for the number of pieces desired.

Another object of the invention is to provide a device which will indicate the number of pieces which have been gaged.

With these and other objects in view, the invention consists of certain novel features of construction, as will be more fully described and particularly pointed out in the appended claims.

In the accompanying drawings:

Figure 1 is a side elevation, with the cover plate removed, of the apparatus which is the subject of this invention;

Figure 2 is a section on substantially line 2—2 of Figure 1;

Figure 3 is a section on line 3—3 of Figure 1;

Figure 4 is a fragmental view showing parts of the structure illustrated in Figure 3 on a larger scale;

Figure 5 is a section on substantially line 5—5 of Figure 1;

Figure 6 is a section similar to Figure 5 but showing the parts in a different position; and Figures 7 to 12 are sectional views illustrating the parts of the gaging apparatus in different positions, which will correspond to certain positions in a series of measurements or gagings of different pieces of work.

In proceeding with this invention, I have arranged a casing which encloses the moving parts and which has projecting from the upper wall thereof one part of the gaging rod; while projecting through the bottom wall thereof, there is another part of the gaging rod which will engage the work; while a dial indicator engages the part which extends through the top of the casing so so to indicate the movement of this rod. The two parts of this measuring rod are so related that the lower part will be moved a certain distance depending upon the work which is being gaged at each positioning of the piece of work below it, while the upper part of the rod will travel a distance corresponding to the first piece of work and will then be retained in that position, and when the next piece of work is gaged, it will move a further distance depending upon the gage of that particular piece of work and so on throughout the series of pieces of work which are operated upon. A handle is manually pulled to cause the gaging of each of the pieces of work as the test proceeds. All of this is then compared with a standard piece of work, which has previously been gaged, and the average may be read directly from the dial.

With reference to the drawings, 10 designates a bracket which is adjustably supported upon a post 11 and carries a supporting structure 12 in which the various movable parts of the apparatus are mounted. A standard 13 extends upwardly from the frame for carrying a dial indicator 14 which is adjustably located in a slot in the standard by means of a thumb nut 15. The work is designated generally 16 and is supported upon some suitable table or the like 17.

The dial indicator 14 is of a standard type having a contact plunger 20 extending through the collar 21 from the casing 22, the front portion of which is shown in Figure 2 as equipped with an indicator arm 23' moving over a dial 23 which may be adjusted to a desirable position by the bezel 24, knurled as at 25 for manual rotary movement to the desired position.

The supporting structure 12 comprises a pair of spaced horizontal frame members 30 and 31, there being a bearing or guide opening 32 in the frame 30 and a bearing or guide opening 33 in the frame 31. These frames 30 and 31 are held in spaced relation by the vertical frame members 34 and 35 providing in effect a casing for enclosing the movable parts of the mechanism. This structure 30, 31, 34, and 35 is closed on one side by a wall 36, while it may be closed on the other side by a cover wall 37 suitably held in position by threaded members as may be desired.

A rod designated generally 38 comprises an outer tubular part 39 which telescopically receives therein an inner solid part 40. The rod 40 reciprocably slides through the bearing 33 and is guided thereby. Its outer end carries a work contact tip 41 threaded as at 42 into the end of the rod 40. A collar 43 embraces the rod 40 outside of the frame member 31 and is adjustably held along the rod by a set screw 44. This collar 43 abuts the outer surface 45 of the frame member 31 so as to limit the upward movement of the rod through the frame member 31. A pin 46 extends radially at right angles to the axis of the rod 40 and at one end enters between spaced guiding surfaces 47 to prevent the rod from rotating, while a spring 48 engages the other end of the pin and serves to urge the rod upwardly by contraction between the pin 46 and the anchor 49 on the casing so as to cause the collar 44 to engage the surface 45. This spring will carry the part 40 of the rod 38 upwardly and any parts secured thereto.

The tubular part 39 of the measuring rod 38 is slidably guided in the bearing 32 and receives a collar 50 held in position by set screw 51 so as to limit the upward movement of this part of the rod by engagement with the inner surface 52 of the frame member 30. The upper end of the rod part 39 is capped by a headed member 53 having a threaded shank 54 threadingly engaging the interior of this part of the rod, so that it may be adjusted axially of the rod as occasion may require. This part 39 of the rod is slotted as at 55 (see Fig. 7) so that an actuating arm may enter and engage the end of the shank 54 to actuate the same.

An L-shaped bracket 56 is fixed to and extends outwardly from the vertical frame member 34 and provides an additional bearing guide for the part 39 of the rod. Below this bracket, the part 39 is milled away so as to provide a very narrow connection 57 (see Figs. 5 and 6) between a clutch part 58 and the end of the tubular part 39. This clutch part is provided with a flaring mouth 59, 60, while its arms 61 and 62 are bent inwardly sufficient so as to grip the rod part 40. If it is desired that this clutch be relieved from a normal natural grip of the rod part 40, then these portions 61 and 62 of this clutch must be spread in order that this may be accomplished.

Declutching is accomplished by means of a plunger 65 which is reciprocably mounted in a bearing 66 extending from the back wall 36 of the frame structure in which the plunger 65 freely slides. Also, the plunger has a bearing in the L-shaped bracket 56 by reason of the split portion 67 which has screws 68 for contracting the bracket and holding it in adjusted position. This plunger 65 has a wedge-shaped protuberance 69 (see Figures 5 and 6) which is of a size to engage the surfaces 59 and 60 and spread the portions 61 and 62 of the clutch apart to free it from binding engagement with the rod part 40. A spring 70 on the reduced portion 71 of this plunger 65 acts between the shoulder 72 of the plunger and the end 73 of the bore 74 of the adjustable member 75 which is threaded as at 76 through the wall or frame 35 and may be adjusted by means of the knurled hear 77 on the outer surface of this frame 35, so that the desired pressure upon the spring may be had for urging the plunger as desired. An adjustable arm 80 is mounted upon the plunger 65 and secured in any adjusted position by the set screw 81. This arm is provided with a V-shaped protuberance 82 which may be engaged by any one of a plurality of lobes 83 on the cam 84 to force the plunger 65 against the action of its spring and move its wedge 69 out of engagement with the surfaces of the clutch 58. This cam is provided with a plurality of notches or recesses 85 between the high spots or lobes 83 so as to permit the protuberance 82 to enter one of these recesses and the spring to move the wedge into declutching position. This cam 84 is rotatably mounted on a shaft 87 and also independently rotatable on this shaft is an arm 86 which extends through the slot 55 so as to engage either the solid rod part 40 or the end of the stud 54. A manually actuating handle 88 (see Fig. 2) is fixed to shaft 87 which through a ratchet clutch 90 may actuate the member 84 and at the same time spring arm 91 carried by the hub 92 fixed on shaft 87 may engage and move the arm 86 into engagement with the plunger so as to move it downwardly against the action of spring 48 into engagement with the work piece W. An arm 92' beneath arm 86 will engage the arm 86 and swing the same upwardly against the stud 54 to lift the rod 38 until collar 50 engages surface 52.

In operation, the bracket 10 will be adjusted along the post 11 so that the engaging end of the dial contact member 41 will be a distance above the work greater than any similar dimension of a work piece to be engaged (see Figs. 7-12). Assuming the range of tolerances to be five thousandths, the amount the end of the contact 41 will be set above the work would be something in the neighborhood of twenty thousandths. A standard work piece W with which all other work pieces were to be compared would then be placed upon the surface 17. After both of the collars 43 and 50 were against their abutment surfaces 45 and 52, the lever arm 88 and shaft 87 would be moved counterclockwise in Figs. 7-12. As shown in Figure 7, this movement of the handle 88 first causes cam 84 to move the wedge 69 so as to withdraw the wedge 69 from the surfaces 59 and 60 of the clutch thus causing clutching engagement between the two parts of the measuring rod, while further movement would then cause spring arm 91 to engage the arm 86 to move both parts of the measuring rod downwardly until contact 41 engages the work, and a further movement of the handle 88 would flex spring arm 91 and cam to move so that the projection 82 would enter the next succeeding one of the notches 85 whereupon the plunger 65 would move to the left in Figs. 7-12 causing a declutching action, holding the upper part 39 of the measuring rod in position, while freeing the lower part of the measuring rod 40 to be moved upwardly under influence of the spring 48 until its collar 44 engages the abutment surface 45. Then the lever arm 88 would be returned to its initial position by spring 93 acting on hub 92 and causing the ratchet teeth at 90 to slip one past the other by flexing spring 94 so that this might be performed. This action would be had five times if an average of five pieces were to be taken with reference to the standard measuring block, and then the dial would be set to a position of zero after these five operations have been performed on the standard block.

The five specimens to be average would now be put through the cycle of operations such as above described, that is, the first piece would be positioned on the surface 17; the arm 88 and shaft 84 would be rotated counterclockwise in Figs. 7–12 so as to cause the plunger 65 to be withdrawn and permitting the clutch to lock the two parts of the measuring rod together whereupon continued movement would cause this measuring rod to be moved downwardly against the action of the spring 48 into engagement with the first work piece, which we may assume, for example, is one thousandth smaller than the standard giving a movement of twenty-one thousandths for the contact arm 41. Both parts of the rod 39 and 40 are moved at the same time this distance. Now, as the operation of the manual lever arm 88 continues, the cam surface will permit projection 82 to enter one of the notches which will permit the plunger 65 to move forwardly under influence of the spring 70, thus freeing the clutch from the part 40, while holding the part 39 in fixed position such as shown in Figure 7 by friction of the wedge 69. However, as the part 40 is free to move, the spring 48 moves the part upwardly until its collar 43 engages the abutment surface 45. The lever arm 88 is then returned to its initial position through its ratchet connection 90. A second piece is then placed in the position of the former piece, and the arm is again brought downwardly which serves to move both parts of the measuring rod 39 and 40 downwardly to engage the second piece, which we may assume is still smaller for example, two thousnadths under size which would then result in a movement of twenty-two thousandths. In this case, then, the collar 50 which firstly moved twenty-one thousandths is moved another twenty-two thousandths or a total of forty-three thousandths, as shown in position in Figure 9; while the movement of the collar 43 from its abutment surface 45 in Figure 9 is, the twenty-two thousandths which is the distance of the second piece which is to be measured. Again, as the lever arm is continued in its movement, the projection 82 moves into the next notch permitting the plunger to move fowardly thus spreading the clutch, releasing it from the rod part 40 permitting its rod part to move upwardly under influence of the spring 48, while retaining the upper part of the rod 39 in this new position, the parts being returned to the position shown in Figure 10. A third piece will now be placed in position for checking and, in this instance, it is assumed that this piece is over size by one thousandth; thus, by movement of the lever arm 88, it retracts the plunger 65 causing through the arm 86 a movement of both parts of the measuring rod downwardly until it engages the work piece shown in Figure 11 which we have assumed is one thousandth over size giving a total movement of nineteen thousandths rather than the twenty thousandths the device is set above the standard work piece. In this case, then, the movement of the collar 43 will be nineteen thousandths as shown in Figure 11, while the collar 50 in Figure 11 has been moved a total of twenty-one plus twenty-two plus nineteen thousandths, giving a movement from its abutment surface 52 a total of sixty-two thousandths. Two additional pieces making a total of five will be checked. Thus, it will be apparent that as additional pieces of work are placed into the machine or apparatus and gaged, that each time the collar 50 will add to its movement from the abutment surface 52 an amount corresponding to the dimension of the piece being gaged. At the end of the five pieces, a comparison will be made on the dial indicator which has its plunger 20 following the measuring rod to see the comparison with the zero mark which was previously set for a total of the five measurements on the standard block. One of the standard type dial indicators will have each spacing representing one ten-thousandth of an inch; thus, as shown in Figure 2, numeral 1 would indicate one thousandth, numeral 2 two thousandths, etc., up to five thousandths, either plus or minus, and if a reading were obtained of minus 1 after the five specimens had been checked, it would indicate that the average of the five specimens was minus one thousandth away from standard. If the reading were plus two thousandths, then it would indicate that the average of the five specimens was two thousandths over the standard, etc. The averaging is done as above indicated on a standard block so that no errors in the instrument itself will appear in the final average. It is found that this is a more accurate way of measuring than by relying upon the movement of the mechanism in the dial indicator.

In order that the number of specimens gaged may be known, I have provided a casing 95 having a window 96 therein, and within this casing there is a drum 97 provided with a plurality of numbers 98 which correspond to the lobes 83 on the cam. This drum will be so fixed with relation to the cam that it will rotate each time the cam rotates so as to bring one of the numbers 98 in front of the window 96 to be viewed. In the present instance, I have shown ten lobes on the cam and there are ten numbers, these numbers being arranged in two series of from 1 to 5 about the drum, it being intended in the particular arrangement here shown that five pieces will be taken for averaging, although if desired ten may be taken and the cam and drum be rotated once around for a complete revolution and through two series of numerals 1 to 5.

I claim:

1. For use with a dial indicator, an accumulator comprising a frame structure, spaced bearings supported by said structure for reciprocally mounting a measuring rod having inner and outer tubular parts with the inner part telescoping into the outer part, spaced abutment surfaces carried by said frame structure, a collar fixed on each part, one collar to engage one abutment surface and the other collar to engage the other abutment surface and limit the movement in one direction of each of said parts, a collar clutch fixed to said outer part and embracing the inner part to grip the inner part when contacted, means to declutch said parts and at the same time hold said outer part fixed while freeing the inner part for movement and a spring engaging the inner part for urging the freed inner part to cause the collar thereon to engage its abutment.

2. The combination of claim 1 wherein a resilient arm engages and moves the freed inner part away from its abutment and against the work.

3. The combination of claim 1 wherein said clutch has a flaring mouth, said declutching means comprising a wedge to enter said mouth.

4. The combination of claim 1 wherein said clutch has a flaring mouth, said declutching means comprising a wedge to enter said mouth and a cam engaging and actuating said wedge.

5. An accumulator for use in gaging pieces of work comprising a measuring rod having two relatively moving parts, means to reciprocably mount said rod for axial movement, clutch means to fix said rod parts together for movement as a single unit, means including a rotatable shaft to operate said clutch means and release said rod parts, said shaft having means attached thereto to engage one of said rod parts and vary the relative length of said rod by endwise movement of said parts into engagement with a work piece.

JOHN H. WORTHEN.

REFERENCES CITED

The following references are of record in the file of this patent

UNITED STATES PATENTS

| Number | Name | Date |
|---|---|---|
| 2,246,146 | Smith | June 17, 1941 |
| 2,321,717 | Wallace | June 15, 1943 |